United States Patent
Takai et al.

(10) Patent No.: US 10,298,027 B2
(45) Date of Patent: May 21, 2019

(54) METHOD OF CONTROLLING A SWITCH CIRCUIT, STORAGE STATUS ADJUSTING CIRCUIT, STORAGE STATUS ADJUSTING DEVICE AND STORAGE BATTERY PACK

(71) Applicant: RICOH COMPANY, LTD., Tokyo (JP)

(72) Inventors: Masami Takai, Tokyo (JP); Akira Nakamura, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/119,943

(22) PCT Filed: Feb. 25, 2015

(86) PCT No.: PCT/JP2015/056275
§ 371 (c)(1),
(2) Date: Aug. 18, 2016

(87) PCT Pub. No.: WO2015/129922
PCT Pub. Date: Sep. 3, 2015

(65) Prior Publication Data
US 2017/0063109 A1    Mar. 2, 2017

(30) Foreign Application Priority Data

Feb. 28, 2014   (JP) ................................ 2014-039210
Dec. 9, 2014    (JP) ................................ 2014-249245
Feb. 12, 2015   (JP) ................................ 2015-024870

(51) Int. Cl.
*H02J 7/00*     (2006.01)
*H01M 10/42*    (2006.01)
*H01M 10/44*    (2006.01)

(52) U.S. Cl.
CPC ....... *H02J 7/0019* (2013.01); *H01M 10/4257* (2013.01); *H01M 10/44* (2013.01); *H02J 7/0021* (2013.01); *H01M 2010/4271* (2013.01)

(58) Field of Classification Search
CPC .......... H02J 7/02; H02J 7/0019; H01M 10/44; H01M 10/4257
(Continued)

(56) References Cited

U.S. PATENT DOCUMENTS 6,642,693 B2    11/2003   Anzawa et al.
8,164,305 B2    4/2012    Zhang et al.
(Continued)

FOREIGN PATENT DOCUMENTS

JP    2002-223528    8/2002
JP    2011-083182    4/2011
(Continued)

OTHER PUBLICATIONS

International Search Report dated May 12, 2015 in PCT/JP2015/056275 filed on Feb. 25, 2015.

*Primary Examiner* — Richard Isla
*Assistant Examiner* — Johali A Torres Ruiz
(74) *Attorney, Agent, or Firm* — Oblon, McClelland, Maier & Neustadt, L.L.P.

(57) ABSTRACT

The method is disclosed of controlling a switch circuit which includes a first switching unit configured to switch between energy accumulation and energy release in a coil, and second switching units configured to connect or disconnect a plurality of corresponding storage batteries with the coil. The method comprises a first step of performing an operation to switch on the first switching unit and to switch off the second switching units; and a second step of performing an operation to switch off the first switching unit and to switch on only one of the second switching units.

5 Claims, 8 Drawing Sheets

(58) Field of Classification Search
USPC .......................................... 320/116, 118, 122
See application file for complete search history.

(56) References Cited

U.S. PATENT DOCUMENTS

| | | | |
|---|---|---|---|
| 2008/0231231 A1* | 9/2008 | Hartzog | H02J 7/0016 |
| | | | 320/118 |
| 2011/0267005 A1* | 11/2011 | Gollob | H02J 7/0014 |
| | | | 320/116 |
| 2013/0002203 A1 | 1/2013 | Kuraishi | |
| 2013/0093248 A1 | 4/2013 | Liu | |
| 2013/0187612 A1* | 7/2013 | Aiura | H01M 10/425 |
| | | | 320/118 |
| 2013/0320914 A1* | 12/2013 | Li | H02J 7/0014 |
| | | | 320/103 |
| 2015/0140374 A1 | 5/2015 | Yamamoto et al. | |
| 2015/0222137 A1* | 8/2015 | Wang | H02J 7/007 |
| | | | 320/103 |
| 2015/0236534 A1* | 8/2015 | Kim | H02J 7/0016 |
| | | | 320/118 |
| 2015/0340886 A1* | 11/2015 | Sung | H01M 10/441 |
| | | | 320/118 |

FOREIGN PATENT DOCUMENTS

| | | |
|---|---|---|
| JP | 2013-013268 | 1/2013 |
| JP | 2015-119614 | 6/2015 |

* cited by examiner

METHOD OF CONTROLLING A SWITCH CIRCUIT, STORAGE STATUS ADJUSTING CIRCUIT, STORAGE STATUS ADJUSTING DEVICE AND STORAGE BATTERY PACK

TECHNICAL FIELD

The present technology relates to a switch circuit controlling method with respect to adjustment of storage status of a plurality of storage devices capable of charge and discharge, a storage status adjusting circuit, a storage status adjusting device, and a storage battery pack.

BACKGROUND ART

A storage battery pack, having a plurality of secondary batteries (cells) connected in series, which has an electronic circuit to average cell voltages of the cells, has been known. As for averaging cell voltages, an active method, in which electricity is transferred between the cells, is gathering attention.

An electronic circuit adopting the active method has a transformer and a switching element for activating the transformer, accumulates electricity in a primary coil during the time the switching element is turned on, and outputs electricity accumulated in the primary coil to a secondary coil when the switching element is turned off. An averaging of cell voltages in secondary batteries is performed by repeating such an operation to provide a cell connected with the secondary coil with electricity, in an electronic circuit adopting the active method (for example, Japanese Laid-open Patent Publication No. 2002-223528, No. 2011-83182, No. 2013-13268).

RELATED ART DOCUMENT

Patent Document

[Patent Document 1]: [Patent Document 1]: Japanese Laid-open Patent Publication No. 2002-223528
[Patent Document 2]: Japanese Laid-open Patent Publication No. 2011-83182
[Patent Document 3]: Japanese Laid-open Patent Publication No. 2013-13268

DISCLOSURE OF THE INVENTION

Problems to be Solved by the Invention

However, in an electronic circuit adopting the active method, energy-loss by the transformer is large.

An object of disclosure of the present technology is to reduce energy-loss.

Means for Solving the Problems

According to an embodiment of the present invention, there is provided a method of controlling a switch circuit which includes a first switching unit configured to switch between energy accumulation and energy release in a coil, and second switching units configured to connect or disconnect a plurality of corresponding storage batteries with the coil, the method comprising: a first step of performing an operation to switch on the first switching unit and to switch off the second switching units; and a second step of performing an operation to switch off the first switching unit and to switch on only one of the second switching units.

Effects of the Present Invention

According to the disclosed technology, energy-loss can be reduced.

MODE FOR CARRYING OUT THE INVENTION

Figure 1:
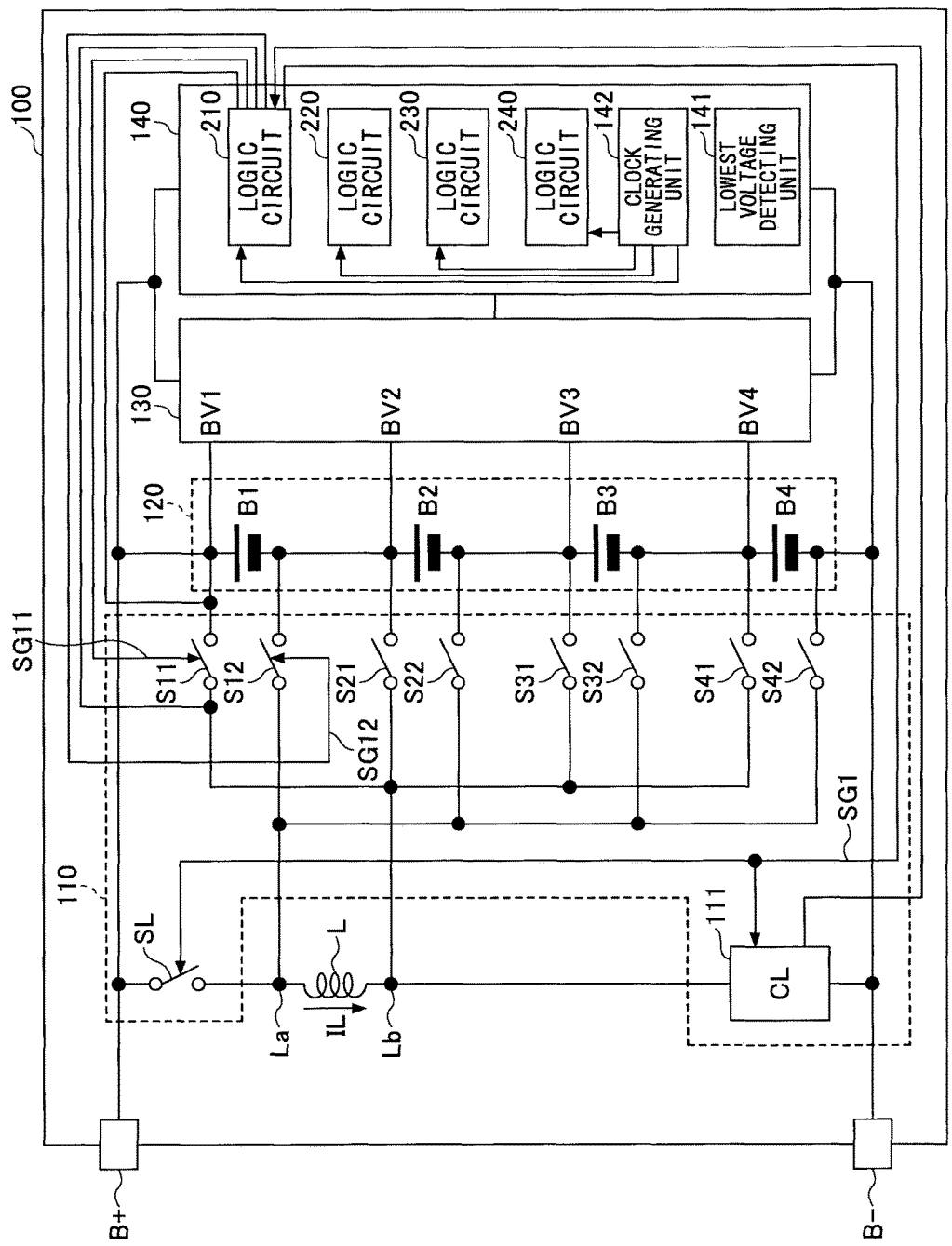
FIG. 1 is an illustration diagram of a storage battery pack of the first embodiment.

Herein below, embodiments will be described with reference to the accompanying drawings. FIG. 1 is an illustration diagram of a storage battery pack of a first embodiment.

A storage battery pack 100 of the present embodiment includes a B+ terminal, a B− terminal, a coil L, a storage status adjusting circuit 110, an assembled battery 120, a cell voltage detecting circuit 130, and a controller 140.

The storage status adjusting circuit 110 of the present embodiment performs averaging of cell voltages in a plurality of secondary batteries included in the assembled battery 120, and adjusts a status of electric energy storage (i.e. storage status) in each of the secondary batteries.

The storage battery pack 100 of the present embodiment supplies electricity accumulated in the assembled battery 120 to a load connected through the B+ terminal and the B− terminal. Also, the storage battery pack 100 of the present embodiment charges the secondary batteries in the assembled battery 120 by a battery charger connected through the B+ terminal and the B− terminal.

The storage status adjusting circuit 110 of the present embodiment includes switching elements SL, S11, S12, S21, S22, S31, S32, S41 and S42, and a current limiting circuit 111. Each of the switching elements in the storage status adjusting circuit 110 of the present embodiment is, for example, a MOSFET (Metal-Oxide-Semiconductor Field-Effect Transistor), or the like.

The assembled battery 120 of the present embodiment includes a secondary battery B1, a secondary battery B2, a secondary battery B3 and a secondary battery B4. The secondary batteries B1-B4 are storage means capable of charge and discharge, and are connected in series between the B+ terminal and the B− terminal.

Although the present embodiment is directed to a configuration in which the assembled battery 120 has the four secondary batteries B1-B4, this is not a limiting example. The secondary batteries may be configured with such as electric double-layer capacitors, or the like. Further, in the present embodiment, although there are four of the secondary batteries included in the assembled battery 120, this is not a limiting example. The number of the secondary batteries included in the assembled battery 120 may be any number which is greater than or equal to two.

The cell voltage detecting circuit 130 in the present embodiment detects respective cell voltages in the secondary batteries B1-B4, and outputs the detected cell voltages to the controller 140.

The controller 140 of the present embodiment controls supply and shut-off of coil current IL in the coil L. Also, the controller 140 of the present embodiment selects a secondary battery having the lowest cell voltage among the secondary batteries B1-B4, then, lets the coil L release electricity accumulated in the coil L to the selected secondary battery.

More specifically, the controller 140 connects the coil L between the B+ terminal and the B− terminal to supply the coil current IL. When the coil current IL becomes greater than or equal to a certain value, the controller 140 stops supplying the coil current IL to the coil L, and connects the secondary battery having the lowest cell voltage with the coil L. Additionally, the controller 140 of the present embodiment may detect a secondary battery when the coil current IL is supplied to the coil L.

The secondary batteries B1-B4 of the present embodiment are connected in series. A positive electrode of the secondary battery B1 is connected with the B+ terminal, and a negative electrode of the secondary battery B4 is connected with the B− terminal.

Also, one end of the switching element SL is connected with the positive electrode of the secondary battery B1. The other end of the switching element SL is connected with one end of the coil L. In FIG. 1, a connecting point between the coil L and the switching element SL is shown as a connecting point La.

The other end of the coil L is connected with one end of a current limiting circuit 111. In FIG. 1, a connecting point between the coil L and the current limiting circuit 111 is shown as a connecting point Lb. The other end of the current limiting circuit 111 is connected with the B− terminal and the negative electrode of the secondary battery B4. A detailed description of the current limiting circuit 111 will be given below.

In the present embodiment, one end of the switching element S11 is connected with the positive electrode of the secondary battery B1. Similarly, one end of the switching element S21 is connected with the positive electrode of the secondary battery B2, one end of the switching element S31 is connected with the positive electrode of the secondary battery B3, and one end of the switching element S41 is connected with the positive electrode of the secondary battery B4. The other ends of the switching elements S11, S21, S31 and S41 are connected with the connecting point Lb.

In the present embodiment, one end of the switching element S12 is connected with the negative electrode of the secondary battery B1. Similarly, one end of the switching element S22 is connected with the negative electrode of the secondary battery B2, one end of the switching element S32 is connected with the negative electrode of the secondary battery B3, and one end of the switching element S42 is connected with the negative electrode of the secondary battery B4. The other ends of the switching elements S12, S22, S32 and S42 are connected with the connecting point La.

Thus, in the present embodiment, the switching elements S11 and S12 are disposed corresponding to the secondary battery B1, and form a switching unit that controls connection/disconnection between the secondary battery B1 and the coil L. Also, the switching elements S21 and S22 are disposed corresponding to the secondary battery B2, and form a switching unit that controls connection/disconnection between the secondary battery B2 and the coil L. The switching elements S31 and S32 are disposed corresponding to the secondary battery B3, and form a switching unit that controls connection/disconnection between the secondary battery B3 and the coil L. The switching elements S41 and S42 are disposed corresponding to the secondary battery B4, and form a switching unit that controls connection/disconnection between the secondary battery B4 and the coil L.

In the present embodiment, the cell voltage detecting circuit 130 and the controller 140 are connected between the B+ terminal and the B− terminal.

The controller 140 of the present embodiment includes logic circuits 210, 220, 230 and 240. Also, the controller 140 of the present embodiment includes a lowest voltage detecting unit 141 and a clock generating unit 142.

The logic circuit 210 of the present embodiment, corresponding to the secondary battery B1, controls supply of electricity from the coil L and shut-off therefrom. The logic circuit 220 of the present embodiment, corresponding to the secondary battery B2, controls supply of electricity from the coil L and shut-off therefrom. The logic circuit 230 of the present embodiment, corresponding to the secondary battery B3, controls supply of electricity from the coil L and shut-off therefrom. The logic circuit 240 of the present embodiment, corresponding to the secondary battery B4, controls supply of electricity from the coil L and shut-off therefrom.

The lowest voltage detecting unit 141 of the present embodiment detects a secondary battery having the lowest cell voltage among the secondary batteries B1-B4, based on the output from the cell voltage detecting circuit 130, and informs the logic circuits of the detection result.

Specifically, the lowest voltage detecting unit 141 has provided the logic circuits 210, 220, 230 and 240 with select notification signals with a low level (hereinafter referred to as L level), in advance. When the lowest voltage detecting unit 141 detects the secondary battery having the lowest cell voltage, the lowest voltage detecting unit 141 may invert the level of the select notification signal, which is provided to the logic circuit corresponding to the detected secondary battery, to a high level (hereinafter referred to as H level).

The clock generating unit 142 of the present embodiment generates clock signals to be provided to the logic circuits 210, 220, 230 and 240. The clock generating unit 142 of the present embodiment provides the clock signal of a certain frequency to the logic circuits that corresponds to the secondary battery detected by the lowest voltage detecting unit 141, and the level of the clock signals may be fixed when the clock signals are provided to the logic circuits that corresponds to the secondary batteries other than the detected secondary battery.

The logic circuit 210 generates a signal SG1' that is a base of a control signal SG1 for controlling the switching element SL and a switching element SOL (see FIG. 2) included in the current limiting circuit 111, a control signal SG11 for controlling the switching element S11, and a control signal SG12 for controlling the switching element S12. The logic circuit 220 generates the signal SG1', a control signal for controlling the switching element S21, and a control signal for controlling the switching element S22. The logic circuit 230 generates the signal SG1', a control signal for controlling the switching element S31, and a control signal for controlling the switching element S32. The logic circuit 240 generates the signal SG1', a control signal for controlling the switching element S41, and a control signal for controlling the switching element S42.

The controller 140 of the present embodiment has an OR circuit whose input signal is the signal SG1' respectively generated by the logic circuits 210, 220, 230 and 240, and an output signal of the OR circuit is the control signal SG1.

Additionally, in FIG. 1, only connection between the logic circuit 210 and the switching element SL, connection between the logic circuit 210 and the current limiting circuit 111, and connections between the logic circuit 210 and the switching elements S11 and S12 are shown. In the storage battery pack 100 of the present embodiment, connection between the logic circuit 220 and the switching element SL, connection between the logic circuit 220 and the current limiting circuit 111, and connections between the logic circuit 220 and the switching elements S21 and S22 are the same as connection between the logic circuit 210 and the switching element SL, connection between the logic circuit 210 and the current limiting circuit 111, and connections between the logic circuit 210 and switching elements S11 and S12. Also, the connection between the logic circuit 230 and the switching element SL, connection between the logic circuit 230 and the current limiting circuit 111, connections between the logic circuit 230 and the switching elements S31 and S32, connection between the logic circuit 240 and the switching element SL, connection between the logic circuit 240 and the current limiting circuit 111, and connections between the logic circuit 240 and the switching elements S41 and S42 are respectively the same as connection between the logic circuit 210 and the switching element SL, connection between the logic circuit 210 and the current limiting circuit 111, and connections between the logic circuit 210 and switching elements S11 and S12. A detailed description of the logic circuits 210, 220, 230 and 240 will be given later.

As described above, in the present embodiment, the controller 140 detects a secondary battery having the lowest cell voltage, and outputs control signals to connect the detected secondary battery with the coil L. The storage status adjusting circuit 110 operates the switching elements based on the control signals. In the storage status adjusting circuit 110 of the present embodiment, through such operation, electricity accumulated in the coil L is supplied to a secondary battery having the lowest cell voltage; then, storage status of secondary batteries B1-B4 is adjusted.

In the following, current limiting circuit 111, and logic circuits 210, 220, 230, and 240 of the present embodiment are described with reference to FIG. 2.

Figure 2:
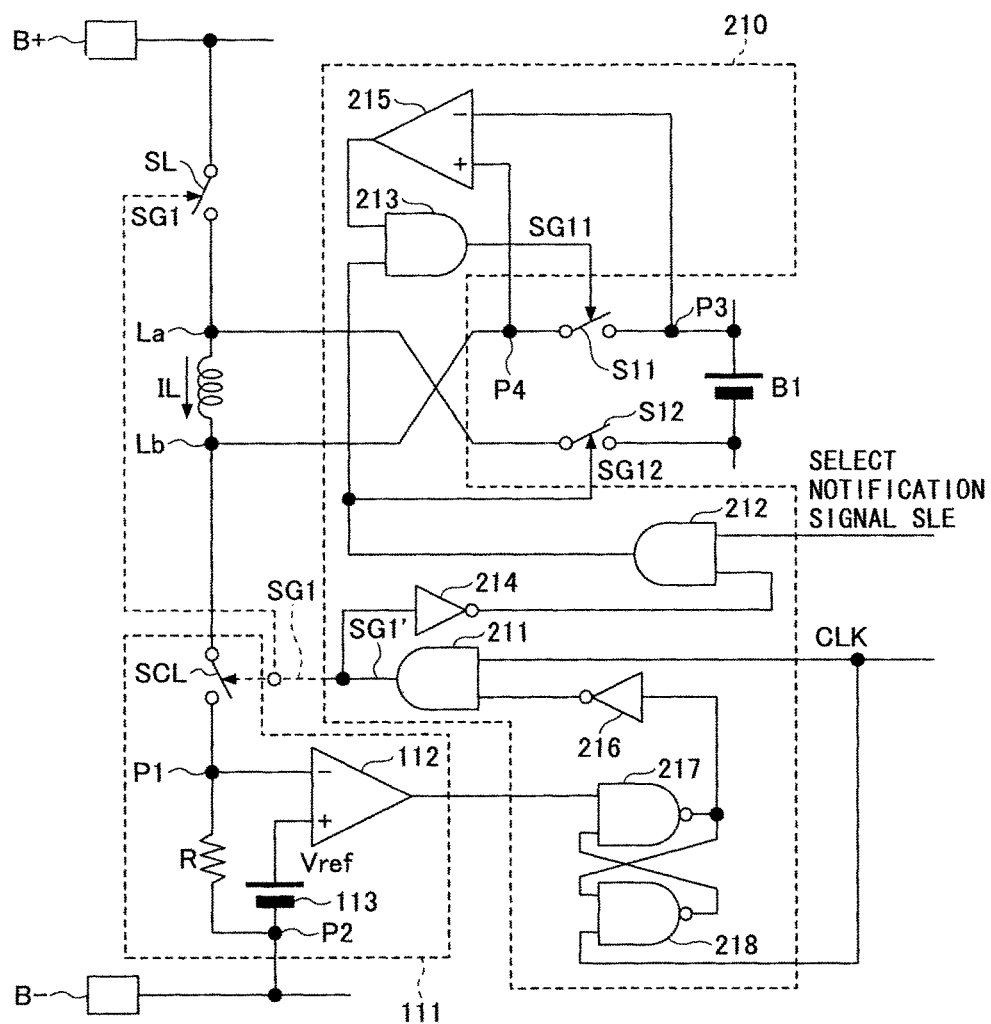
FIG. 2 is an illustrative drawing for illustrating a current limiting circuit and a logic circuit of the first embodiment.

FIG. 2 is an illustrative drawing for illustrating a current limiting circuit and a logic circuit of the first embodiment. The logic circuits 210, 220, 230, and 240 of the present embodiment have identical configurations. Therefore, in FIG. 2, the logic circuit 210 is shown as an example. Additionally, the logic circuit 210 in FIG. 2 is an example of a circuit for performing an operation shown in a timing diagram in FIG. 3. The logic circuit 210 may only have a configuration for performing the operation shown in the timing diagram in FIG. 3.

The current limiting circuit 111 of the present embodiment includes a switching element SCL, a resistor R, a comparator 112 and a reference voltage generating unit 113.

One end of the switching element SCL is connected with the connecting point Lb and the other end of the switching element SCL is connected with the connecting point P1 at which an inverting input terminal of the comparator 112 and one end of the resistor R are connected. The switching elements SL and SCL of the present embodiment are controlled to be switched on-off by the control signal SG1 output from the logic circuit 210. That is, the switching elements SL and SCL of the present embodiment form a switching unit that controls connection/disconnection in series between secondary batteries B1-B4 and the coil L. In other words, the switching elements SL and SCL of the present embodiment form a switching unit that controls accumulation and release of electricity of the coil L. The other end of the resistor R is connected with a connecting point P2 at which a negative electrode of the reference voltage generating unit 113 and the B− terminal are connected.

The reference voltage generating unit 113 generates a reference voltage Vref, and a positive electrode thereof is connected with a non-inverting input terminal of the comparator 112. An output terminal of the comparator 112 is connected with one input terminal of a NAND circuit 217 described below.

The logic circuit 210 of the present embodiment includes AND circuits 211, 212 and 213, a NOT circuit 214 and a comparator 215. Also, the logic circuit 210 of the present embodiment includes a NOT circuit 216, and NAND circuits 217 and 218.

An output signal of the NOT circuit 216 is provided at one input terminal of the AND circuit 211 and a clock signal CLK output from the clock generating unit 142 is provided at the other input terminal of the AND circuit 211. An output signal of the AND circuit 211 is provided to the NOT circuit 214. Also, an output signal of the AND circuit 211 is provided, as the control signal SG1', to the OR circuit in the controller 140. The output signal of the OR circuit is provided, as the control signal SG1, to the switching elements SL and SCL.

An output signal of the NOT circuit 214 is provided at one input terminal of the AND circuit 212. A select notification signal SLE, output from the lowest voltage detecting unit 141, is provided at the other input terminal of the AND circuit 212.

An output signal of the AND circuit 212, as a control signal SG12 for controlling on-off of the switching element S12, is provided to the switching element S12. Further, the output signal of the AND circuit 212 is provided at one input terminal of the AND circuit 213. An output signal of the comparator 215 is provided at the other input terminal of the AND circuit 213.

An output signal of the AND circuit 213, as a control signal SG11 for controlling on-off of the switching element S11, is provided to the switching element S11.

An inverting input terminal of the comparator 215 is connected with one end of the switching element S11 being connected with secondary battery B1. A connecting point between the inverting input terminal of the comparator 215 and one end of the switching element S11 is shown as a connecting point P3.

A non-inverting input terminal of the comparator 215 is connected with the other end of the switching element S11 being connected with the coil L. A connecting point between the non-inverting input terminal of the comparator 215 and the other end of the switching element S11 is shown as a connecting point P4. In the present embodiment, the NAND circuit 217 and the NAND circuit 218 form a flip-flop. The output signal of the comparator 112 is provided at one input terminal of the NAND circuit 217, and an output signal of the NAND circuit 218 is provided at the other input terminal of the NAND circuit 217. The clock signal CLK output from the clock generating unit 142 is provided at one input terminal of the NAND circuit 218, and the output signal of the NAND circuit 217 is provided at the other input terminal of the NAND circuit 218. The output signal of the NAND circuit 217 is provided at the input terminal of the NOT circuit 216.

Figure 3:
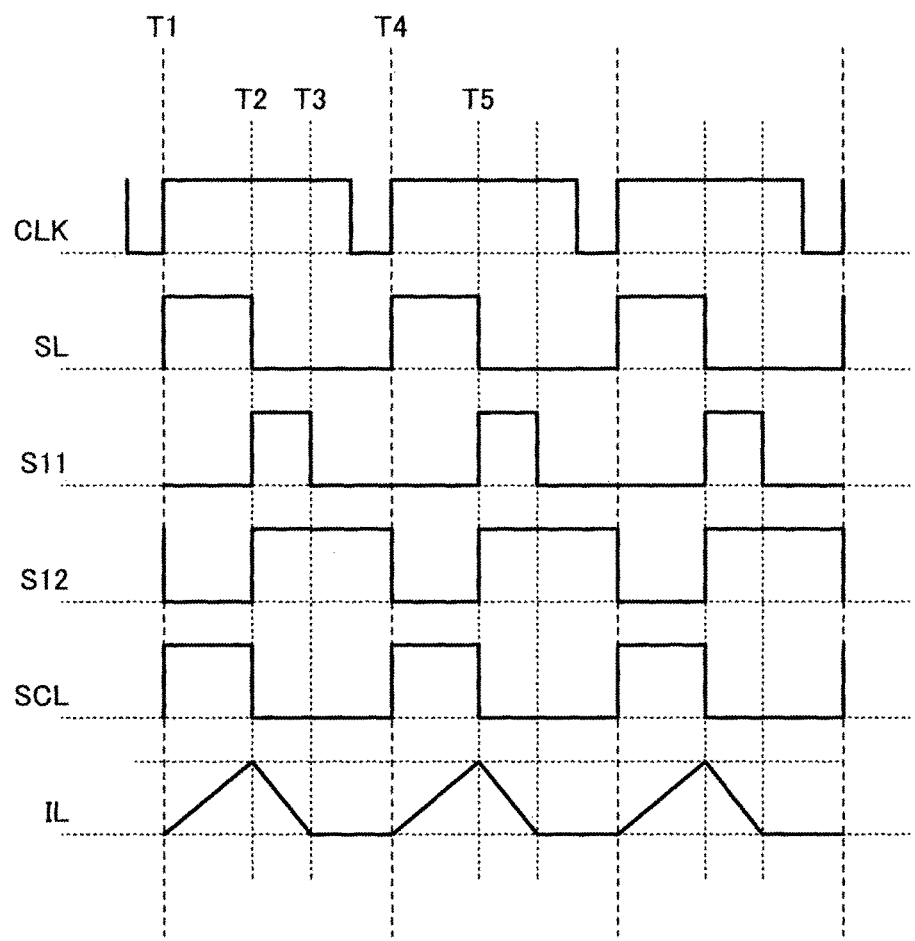
FIG. 3 is a timing diagram for illustrating an operation of a storage status adjusting circuit of the first embodiment.

Herein below, an operation of the storage status adjusting circuit 110 of the present embodiment will be described with reference to FIG. 3. FIG. 3 is a timing diagram illustrating an operation of a storage status adjusting circuit of the first embodiment. In FIG. 3, an operation of the storage status adjusting circuit 110, in a case where the secondary battery B1 has been detected by the lowest voltage detecting unit 141, and a H level select notification signal has been provided to the logic circuit 210, is illustrated.

First, an operation of the storage status adjusting circuit 110 at timing T1 will be described. At timing T1, a H level clock signal CLK is provided. Signal level of an output signal of the comparator 112 is H level, since a voltage between connecting points P1 and P2 does not reach the reference voltage Vref, at timing T1. Therefore, the signal level of the output signal of the NAND circuit 217 becomes L level, and the signal level of the output signal of the NOT circuit 216 becomes H level. Also, the signal level of an output signal of the AND circuit 211 becomes H level. That is, at timing T1, the signal levels of the control signal SG1' and SG1 become H level, then switching elements SL and SOL are switched on to start to supply coil current IL to the coil L.

Also, through the NOT circuit 214, the output signal of the AND circuit 211 is inverted to L level to be provided at one input terminal of the AND circuit 212. The signal level of an output signal of the AND circuit 212 is L level, since a H level select notification signal SLE is provided at the other input terminal of the AND circuit 212. That is, at timing T1, the signal level of the control signal SG12 becomes L level, then the switching element S12 is switched off.

A L level output signal of the AND circuit 212 is provided at one input terminal of the AND circuit 213. Therefore, the signal level of an output signal of the AND circuit 213 is L level regardless of the signal level of an output signal of the comparator 215. That is, at timing T1, the signal level of control signal SG11 becomes L level, then the switching element S11 is switched off.

As described above, in the storage status adjusting circuit 110 of the present embodiment, at timing T1, switching elements SL and SOL are switched on, while switching elements S11 and S12 are switched off.

Thus, in the present embodiment, at timing T1, the coil L is connected in series with the secondary batteries B1-B4 when, for example, the storage battery pack 100 is not connected with a battery charger. In this case, the coil current IL is supplied from the assembled battery 120 to the coil L.

Therefore, in the present embodiment, in a case where a load is connected with the storage battery pack 100, further, even in a case where neither a load nor a battery charger is connected with the storage battery pack 100, averaging cell voltages of the secondary batteries B1-B4 can be performed through the operation of the storage status adjusting circuit 110.

Meanwhile, at timing T1, through the B+ terminal and the B− terminal, the coil L is connected with a battery charger when, for example, the storage battery pack 100 is connected with the battery charger. In this case, the coil current IL is supplied from the battery charger to the coil L.

In the following, an operation of the storage status adjusting circuit 110 at timing T2 will be described. At timing T2, the coil current IL is supplied to the coil L, where the voltage between the connecting points P1 and P2 reaches the reference voltage Vref. At timing T2, an output signal of the comparator 112 is inverted from H level to L level. Therefore, at timing T2, the signal level of the output signal of the NAND circuit 217 becomes H level and the signal level of the output signal of the NOT circuit 216 becomes L level. Thus, an output signal of the AND circuit 211 is inverted to L level regardless of the signal level of the clock signal CLK.

That is, at timing T2, the signal level of signal SG1' becomes L level, and the signal level of control signal SG1 also becomes L level, then the switching elements SL and SOL are switched off to stop supplying the coil current IL to the coil L. Additionally, at timing T2, the signal levels of signals SG1' respectively output from the logic circuit 220, 230 and 240 are all L level. A detailed description of operations of the logic circuits other than a logic circuit being provided with the H level select notification signal (logic circuits 220, 230 and 240, at timing T2) will be given below.

Also, through the NOT circuit 214, the output signal of the AND circuit 211 is inverted to H level to be provided at one input terminal of the AND circuit 212. The signal level of an output signal of the AND circuit 212 becomes H level, since a H level select notification signal is provided at the other input terminal of the AND circuit 212. That is, at timing T2, the signal level of the control signal SG12 becomes H level, then the switching element S12 is switched on.

A H level output signal of the AND circuit 212 is provided at one input terminal of the AND circuit 213. In this case, an electric potential at the connecting point P4 is higher than an electric potential at the connecting point P3, since electricity is accumulated in the coil L. Therefore, the signal level of an output signal of the comparator 215 becomes H level.

Thus, an output signal of the AND circuit 213 is inverted from L level to H level. That is, at timing T2, the signal level of a control signal SG11 becomes H level, and the switching element S11 is switched on.

As described above, in the storage status adjusting circuit 110 of the present embodiment, at timing T2, the switching elements SL and SCL are switched off, while the switching elements S11 and S12 are switched on. Through this operation, in the storage status adjusting circuit 110 of the present embodiment, the secondary battery B1, which has been detected by the lowest voltage detecting unit 141, is connected with the coil L to release electricity (energy) accumulated in the coil L to the secondary battery B1.

In the following, an operation of the storage status adjusting circuit 110 at timing T3 will be described. At timing T3, release of electricity from the coil L to the secondary battery B1 is finished. In the present embodiment, the timing at which release of electricity from the coil L is finished is detected based on a potential difference between the connecting point P3 and the connecting point P4. More specifically, in the present embodiment, an electrical potential at connecting point P3 is compared with an electrical potential at connecting point P4 by the comparator 215. Then, the storage status adjusting circuit 110 switches off the switching element S11 by an output signal of the comparator 215, when the electrical potential at the connecting point P3 becomes higher than the electrical potential at the connecting point P4, thereby disconnecting the coil L from the secondary battery B1. In the present embodiment, through such controlling of the switching element S11, energy back flow from the secondary battery B1 to the coil L is prevented.

At timing T3, when the electric potential at the connecting point P3 is higher than the electric potential at the connecting point P4 through release of electricity from the coil L to the secondary battery B1, an output signal of the comparator 215 is inverted from H level to L level. Therefore, an output signal of the AND circuit 213 is inverted from H level to L level. That is, at timing T3, the signal level of the control signal SG11 becomes L level, then the switching element S11 is switched off to disconnect the coil L from the secondary battery B1.

As described above, in the storage status adjusting circuit 110 of the present embodiment, in a term between timing T2 and timing T3, electricity accumulated in the coil L is supplied to the secondary battery B1 to charge the secondary battery B1.

Additionally, in the present embodiment, at timing T3, the switching elements SL and SCL remain to be switched off while the switching element S12 remains to be switched on. In the present embodiment, the timing at which the control signal SG1 is inverted to H level (the timing at which the switching elements SL and SCL are switched on) is determined based on the clock signal CLK.

Further, in the present embodiment, the control signal SG1 is a signal in reverse phase to the control signal SG12. Therefore, the control signal SG12 is inverted from H level to L level in synchronization with a timing at which the control signal SG1 is inverted from L level to H level. That is, the switching element S12 is switched off in synchronization with a timing at which the switching elements SL and SCL are switched on.

At timing T4, when the signal level of the clock signal CLK becomes H level, similarly to the case of timing T1, the switching elements SL and SCL are switched on while the switching element S12 is switched off. Additionally, at this timing, from timing T3, the switching element S11 remains switched off.

That is, at timing T4, an operation of the storage status adjusting circuit 110 of the present embodiment is similar to that at timing T1, so that the coil current IL starts to be supplied to the coil L.

The lowest voltage detecting unit 141 of the present embodiment may detect a secondary battery having the lowest cell voltage during a term between timing T3 and timing T4 at which the clock signal CLK next rises. Also, the lowest voltage detecting unit 141 may detect a secondary battery having the lowest cell voltage during a term between timing T3 and timing T5 at which supply of the coil current IL to the coil L is stopped. The lowest voltage detecting unit 141 of the present embodiment, for example, may detect a secondary battery having the lowest cell voltage in every certain interval.

Further, in FIG. 3, the operation of the switching elements SL and SCL and the switching elements S11 and S12 that are controlled by the logic circuit 210 is illustrated, while illustration of the operation of the switching elements that are controlled by the logic circuits 220, 230 and 240 is omitted.

In an example of FIG. 3, the logic circuits 220, 230 and 240 respectively control the switching elements S21 and S22, the switching elements S31 and S32, and the switching elements S41 and S42 to be switched off.

Then, for example, if the lowest voltage detecting unit 141 detects the secondary battery B2 after timing T3 shown in FIG. 3, the logic circuit 220 performs a similar operation to an operation of the logic circuit 210 as described above. That is, the logic circuit 220 controls on-off of the switching elements SL and SCL and the switching elements S21 and S22 to release electricity accumulated in the coil L to the secondary battery B2. Meanwhile, the logic circuits 210, 230 and 240 respectively control the switching elements S11 and S12, the switching elements S31 and S32, and the switching elements S41 and S42 to be switched off.

Herein below, an operation of the logic circuit 210, in a case where a secondary battery other than the secondary battery B1 is detected by the lowest voltage detecting unit 141, will be described.

The lowest voltage detecting unit 141 of the present embodiment provides H level select notification signal SLE to a logic circuit which corresponds to the detected secondary battery, while providing L level select notification signal SLE to logic circuits other than the logic circuit which corresponds to the detected secondary battery.

Further, the clock generating unit 142 of the present embodiment provides the clock signal CLK being fixed at a signal level thereof to L level to the logic circuits other than the logic circuit which corresponds to the secondary battery detected by the lowest voltage detecting unit 141.

Therefore, in a case where the lowest voltage detecting unit 141 does not detect the secondary battery B1, the clock signal CLK, which is provided at one input terminal of the AND circuit 211, is fixed to L level, and an output signal of the AND circuit 211 is also fixed to L level. Thus, the signal SG1' is also fixed to L level.

Further, in the logic circuit 212, the select notification signal SLE, which is provided at one input terminal of the AND circuit 212, is fixed to L level, and an output signal of the AND circuit 212 is also fixed to L level. Thus, an output signal of the AND circuit 213 is fixed to L level, and thereby the control signals SG11 and SG12 become L level, then the switching elements S11 and S12 are switched off.

As described above, in the storage status adjusting circuit 110 of the present embodiment, the switching elements SL and SCL are switched on in synchronization with a rising edge of the clock signal CLK, and the coil L is connected between the B+ terminal and the B− terminal to accumulate electricity in the coil L. Also, in the storage status adjusting circuit 110 of the present embodiment, the switching elements S11, S12, S21, S22, S31, S32, S41 and S42 are operated so as to connect the coil L with a secondary battery having the lowest cell voltage when electricity accumulated in the coil L reaches a certain value.

That is, in the present embodiment, a closed loop is formed by connecting the coil L with a secondary battery having the lowest cell voltage, which is detected in every certain interval, then, in this closed loop, electricity accumulated in the coil L is supplied to the secondary battery to charge the secondary battery.

The storage status adjusting circuit 110 of the present embodiment can adjust the storage status through the operation described above to charge only the secondary battery having the lowest cell voltage among the secondary batteries. Further, the storage adjusting circuit 110 of the present embodiment can adjust the storage status of a plurality of the secondary batteries using one coil. Thus, the present embodiment can greatly contribute to downsizing compared to a transformer-type, and this advantageous effect becomes more remarkable, especially, in a case where a larger current has to be controlled. Also, it is known that energy loss is caused by a transformer not only with load but also without load; the present embodiment can eliminate energy loss caused by transformers.

Second Embodiment

Herein below, a second embodiment will be described with reference to the drawings. In the second embodiment, a diode is used to prevent energy back flow from secondary batteries B1-B4 to a coil L, which is different from the case of the first embodiment. Therefore, in the description of the second embodiment below, only the difference between the second embodiment and the first embodiment will be described; an identical reference numeral will be applied to elements or the like that have similar functions and configurations to those of in the first embodiment, and descriptions thereof will be omitted.

Figure 4:
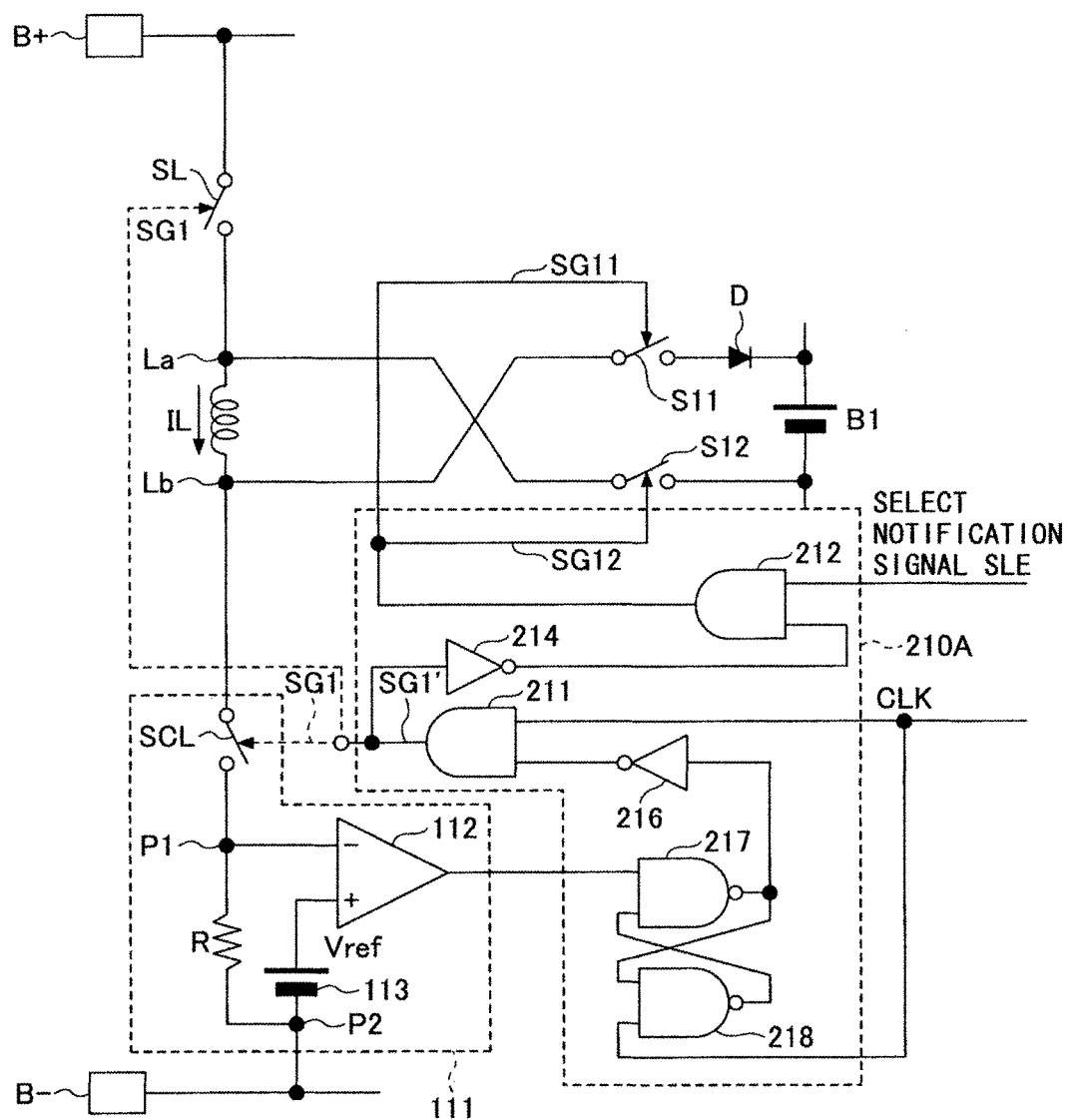
FIG. 4 is an illustrative drawing for illustrating a current limiting circuit and a logic circuit of the second embodiment.

FIG. 4 is an illustrative drawing for illustrating a current limiting circuit and a logic circuit of the second embodiment.

Additionally, in the present embodiment, logic circuits included in the controller 140 have similar functions; therefore, in FIG. 4, a logic circuit 210A is illustrated as an example of four logic circuits.

In the present embodiment, a diode D is disposed between one end of a switching element S11 and a positive electrode of the secondary battery B1. Additionally, in the storage status adjusting circuit of the present embodiment, a diode is respectively disposed, similarly to a configuration shown in FIG. 4, between one end of a switching element S21 and a positive electrode of the secondary battery B2, between one end of a switching element S31 and a positive electrode of the secondary battery B3, and between one end of a switching element S41 and a positive electrode of the secondary battery 34.

The logic circuit 210A of the present embodiment includes AND circuits 211 and 212, and a NOT circuit 214. Also, the logic circuit 210A of the present embodiment includes a NOT circuit 216, and NAND circuits 217 and 218. In the present embodiment, an output signal of the AND circuit 212 is provided, as control signals SG11 and SG12, to the switching element S11 and the switching element S12, respectively.

Therefore, in the present embodiment, the control signal SG11 and the control signal SG12 are signals in reverse phase to the control signal SG1.

Figure 5:
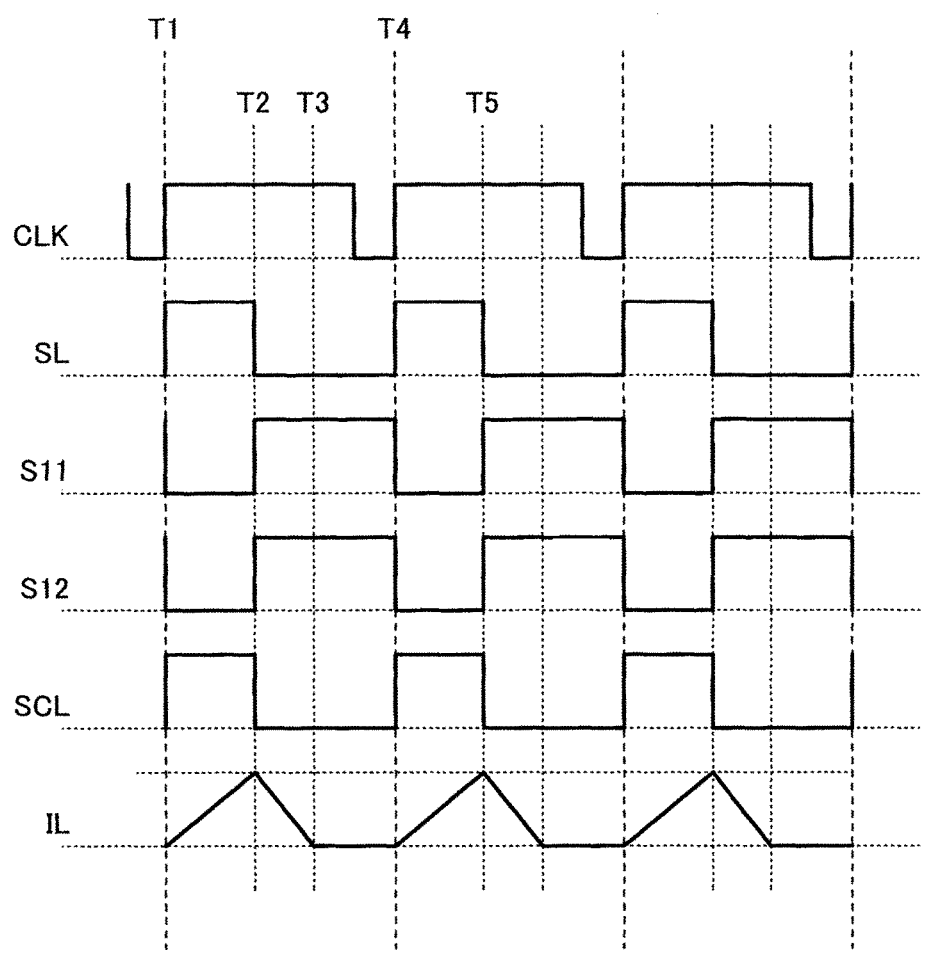
FIG. 5 is a timing diagram for illustrating an operation of a storage status adjusting circuit of the second embodiment.

FIG. 5 is a timing diagram for illustrating an operation of a storage status adjusting circuit of the second embodiment. In the present embodiment, as shown in FIG. 5, the control signal SG11 and the control signal SG12, for controlling a timing at which the switching elements S11 and S12 are switched on/off, are inverted signals of the control signal SG1, for controlling a timing at which switching elements SL and SCL are switched on/off.

Further, in the present embodiment, energy back flow is prevented by the diode D, when an electric potential at a connecting point of the secondary battery B1 and the diode D is higher than an electric potential at a connecting point of the switching element S11 and the diode D. Therefore, in the present embodiment, the coil current IL never has a negative value.

Third Embodiment

Figure 6:
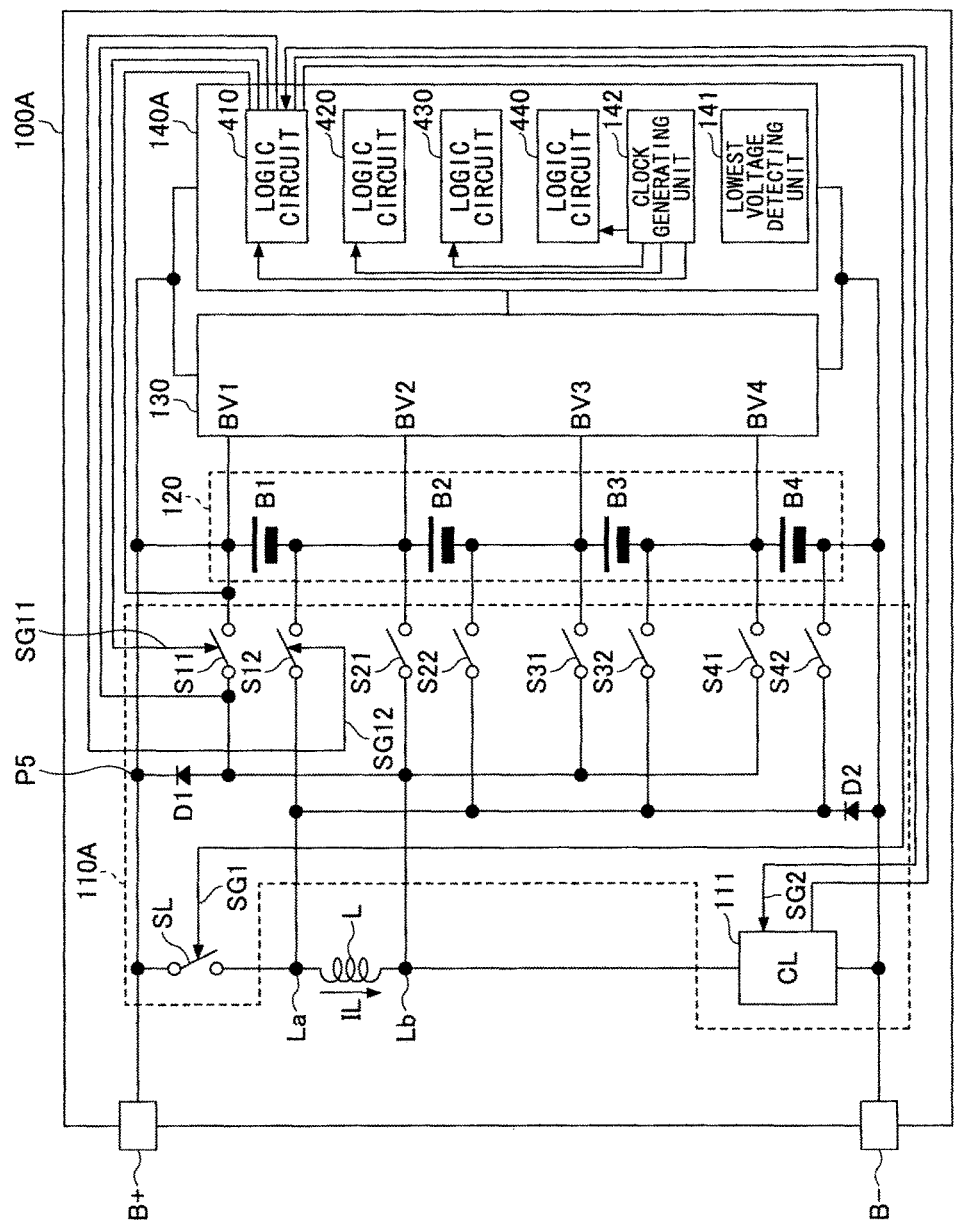
FIG. 6 is an illustrative drawing for illustrating a storage battery pack of the third embodiment.

In the following, a third embodiment will be described with reference to the drawings. In the third embodiment, diodes are respectively disposed between the connecting point La and the B+ terminal and between the connecting point Lb and the B+ terminal, which is different from the case of the first embodiment. Therefore, in the description of the third embodiment below, only the difference between the third embodiment and the first embodiment will be described; an identical reference numeral will be applied to elements or the like that have similar functions and configurations to those of in the first embodiment, and descriptions thereof will be omitted. FIG. 6 is an illustration diagram of a storage battery pack of the third embodiment.

The storage battery pack 100A of the present embodiment includes the B+ terminal, the B− terminal, the coil L, a storage status adjusting circuit 110A, the assembled battery 120, the cell voltage detecting circuit 130, and a controller 140A.

The storage battery pack 100A of the present embodiment supplies electricity accumulated in the assembled battery 120 to a load connected through the B+ terminal and the B− terminal. Also, the storage battery pack 100A of the present embodiment charges the secondary batteries in the assembled battery 120 by a battery charger connected through the B+ terminal and the B− terminal.

Also, in the present embodiment, the other end of the switching element S11 is connected with an anode electrode of a diode D1. A cathode electrode of the diode D1 is connected with the positive electrode of the secondary battery B1 and the B+ terminal. A connecting point between the cathode electrode of the diode D1 and the B+ terminal is shown as a connecting point P5. Further, in the present embodiment, the other ends of the switching elements S11, S21, S31 and S41 are connected with the connecting point Lb.

In the present embodiment, one end of the switching element S12 is connected with the negative electrode of the secondary battery B1. Similarly, one end of the switching element S22 is connected with the negative electrode of the secondary battery B2, one end of the switching element S32 is connected with the negative electrode of the secondary battery B3, and one end of the switching element S42 is connected with the negative electrode of the secondary battery B4.

Also, in the present embodiment, the other end of the switching element S42 is connected with a cathode electrode of a diode D2. The anode electrode of the diode D2 is connected with the negative electrode of the secondary battery B4 and the B− terminal. Further, in the present embodiment, the other ends of the switching elements S12, S22, S32 and S42 are connected with the connecting point La.

The controller 140A of the present embodiment includes logic circuits 410, 420, 430 and 440. Also, the controller 140A of the present embodiment includes the lowest voltage detecting unit 141 and the clock generating unit 142.

The logic circuit 410 of the present embodiment, corresponding to the secondary battery B1, controls supply of electricity from the coil L and shut-off therefrom. The logic circuits 420 of the present embodiment, corresponding to the secondary battery B2, controls supply of electricity from the coil L and shut-off therefrom. The logic circuits 430 of the present embodiment, corresponding to the secondary battery B3, controls supply of electricity from the coil L and shut-off therefrom. The logic circuits 440 of the present embodiment, corresponding to the secondary battery B4, controls supply of electricity from the coil L and shut-off therefrom.

The lowest voltage detecting unit 141 of the present embodiment detects a secondary battery having the lowest cell voltage among the secondary batteries B1-B4, based on the output from the cell voltage detecting circuit 130, and informs the logic circuits of the detection result.

Specifically, the lowest voltage detecting unit 141 has provided the logic circuits 410, 420, 430 and 440 with select notification signals with L level, in advance. When the lowest voltage detecting unit 141 detects the secondary battery having the lowest cell voltage, the lowest voltage detecting unit 141 may invert the level of the select notification signal, which is provided to the logic circuit corresponding to the detected secondary battery, to H level.

The clock generating unit 142 of the present embodiment generates clock signals to be provided to the logic circuits 410, 420, 430 and 440. The clock generating unit 142 of the present embodiment provides the clock signal of a certain frequency to the logic circuit that corresponds to the secondary battery detected by the lowest voltage detecting unit 141, and the level of the clock signal may be fixed when the clock signals are provided to the logic circuits that correspond to the secondary batteries other than the detected secondary battery.

The logic circuit 410 generates signals SG1' and SG2' that are bases of the control signals SG1 and SG2 for controlling the switching element SL and the switching element SCL included in the current limiting circuit 111, the control signal SG11 for controlling the switching element S11, and the control signal SG12 for controlling the switching element S12. The logic circuit 420 generates the signals SG1' and SG2', a control signal for controlling the switching element S21, and a control signal for controlling the switching element S22. The logic circuit 430 generates the signals SG1' and SG2', a control signal for controlling the switching element S31, and a control signal for controlling the switching element S32. The logic circuit 440 generates the signal SG1' and SG2', a control signal for controlling the switching element S41, and a control signal for controlling the switching element S42.

The controller 140A of the present embodiment has an OR circuit whose input signals are the signals SG1' and SG2' respectively generated by the logic circuits 410, 420, 430 and 440, and an output signals of the OR circuit are the control signals SG1 and SG2.

Additionally, in FIG. 6, only connection between the logic circuit 410 and the switching element SL, connection between the logic circuit 410 and the current limiting circuit 111, connections between the logic circuit 410 and the switching elements S11 and S12 are shown. In the storage battery pack 100A of the present embodiment, connection between the logic circuit 420 and the switching element SL, connection between the logic circuit 420 and the current limiting circuit 111, and connections between the logic circuit 420 and the switching elements S21 and S22 are the same as connection between the logic circuit 410 and the switching element SL, connection between the logic circuit 410 and the current limiting circuit 111, and connections between the logic circuit 410 and switching elements S11 and S12. Also, the connection between the logic circuit 430 and the switching element SL, connection between the logic circuit 430 and the current limiting circuit 111, and connections between the logic circuit 430 and the switching elements S31 and S32, and the connection between the logic circuit 440 and the switching element SL, connection between the logic circuit 440 and the current limiting circuit 111, and connections between the logic circuit 440 and the switching elements S41 and S42 are respectively the same as connection between the logic circuit 410 and the switching element SL, connection between the logic circuit 410 and the current limiting circuit 111, and connections between the logic circuit 410 and switching elements S11 and S12. A detailed description of the logic circuits 410, 420, 430 and 440 will be given below.

As described above, in the present embodiment, the controller 140A detects a secondary battery having the lowest cell voltage, and outputs control signals to connect the detected secondary battery with the coil L. The storage status adjusting circuit 110A operates the switching elements based on the control signals. In the storage status adjusting circuit 110A of the present embodiment, through such operation, electricity accumulated in the coil L is supplied to a secondary battery having the lowest cell voltage; then, storage status of the secondary batteries B1-B4 is adjusted.

Further, in the present embodiment, connecting the secondary battery B1 with the coil L by the switching elements S11 and S12 is performed in a manner where the switching element S11 is switched on prior to the switching element S12. Therefore, the present embodiment prevents release of electricity from the secondary battery B1 to the B− terminal caused by connecting a negative electrode of the secondary battery B1 with the B− terminal first, in a connection switching operation. Further, in the present embodiment, by disposing the diodes D1 and D2, it is prevented that both ends of the coil L are disconnected with from any elements, in the connection switching operation.

Therefore, in the present embodiment, the storage status of the secondary batteries B1-B4 can be adjusted, stabilizing an operation of the storage status adjusting circuit 110A.

In the following, current limiting circuit 111, and logic circuits 410, 420, 430, and 440 of the present embodiment are described with reference to FIG. 7.

Figure 7:
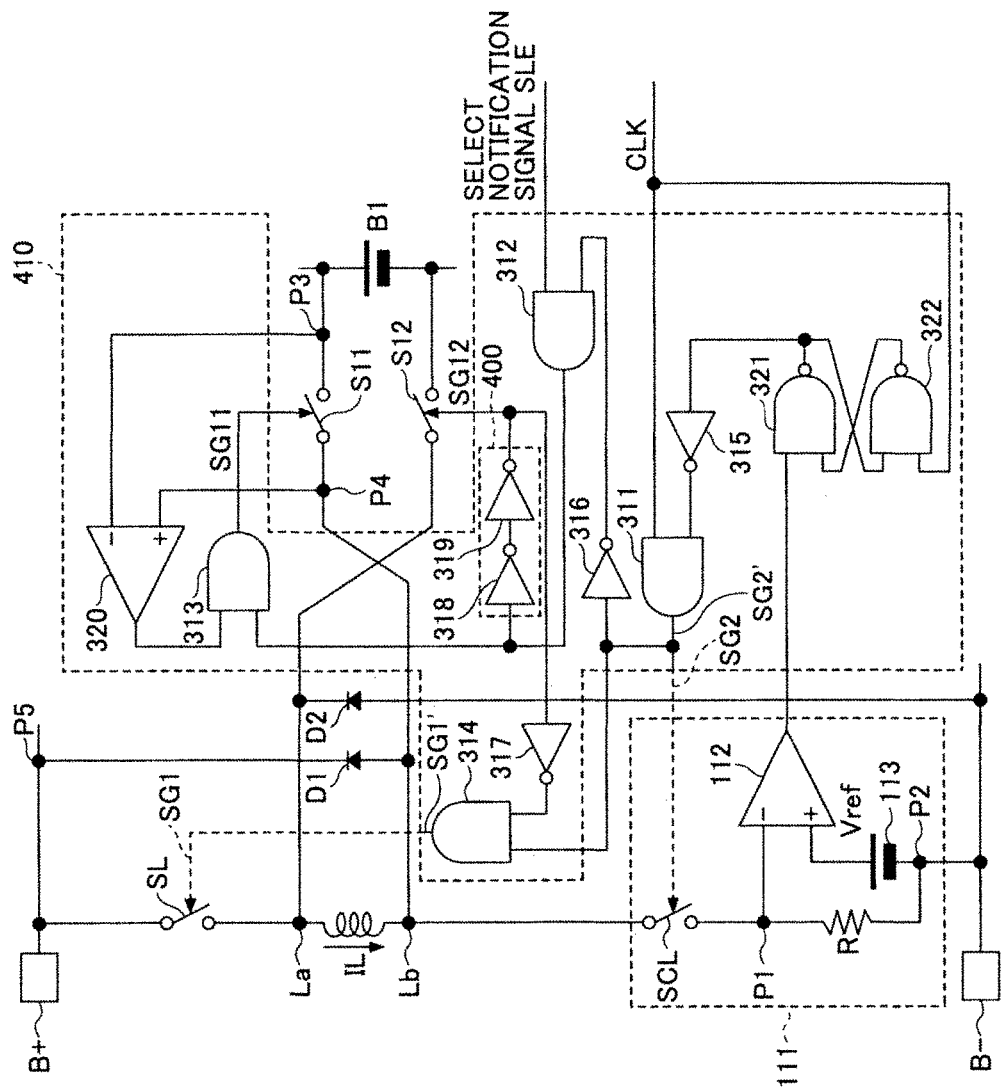
FIG. 7 is an illustrative drawing for illustrating a current limiting circuit and a logic circuit of the third embodiment.

FIG. 7 is an illustrative drawing for illustrating a current limiting circuit and a logic circuit of the third embodiment. The logic circuits 410, 420, 430, and 440 of the present embodiment respectively have identical configurations. Therefore, in FIG. 7, the logic circuit 410 is shown as an example. Additionally, the logic circuit 410 in FIG. 7 is an example of a circuit for performing an operation shown in a timing diagram in FIG. 8. The logic circuit 410 may only have a configuration for performing the operation shown in the timing diagram in FIG. 8.

The current limiting circuit 111 includes the switching element SCL, the resistor R, the comparator 112 and the reference voltage generating unit 113.

One end of the switching element SCL is connected with the connecting point Lb and the other end of the switching element SCL is connected with the connecting point P1 at which an inverting input terminal of the comparator 112 and one end of the resistor R are connected. The switching elements SL and SCL of the present embodiment are controlled to be switched on-off by the control signals SG1 and SG2, respectively output from the logic circuit 410. That is, the switching elements SL and SCL of the present embodiment form a switching unit that controls connection/disconnection in series between the secondary batteries B1-B4 and the coil L. In other words, the switching elements SL and SCL of the present embodiment form a switching unit that controls accumulation and release of electricity of the coil L. The other end of the resistor R is connected with a connecting point P2 at which a negative electrode of the reference voltage generating unit 113 and the B− terminal are connected.

The reference voltage generating unit 113 generates a reference voltage Vref, and a positive electrode thereof is connected with the non-inverting input terminal of the comparator 112. An output signal of the comparator 112 is provided at one input terminal of a NAND circuit 321 described below.

The logic circuit 410 of the present embodiment includes AND circuits 311, 312, 313 and 314, NOT circuits 315, 316, 317, 318 and 319, a comparator 320, and NAND circuits 321 and 322.

The clock signal CLK output from the clock generating unit 142 is provided at one input terminal of the AND circuit 311 and an output signal of the NOT circuit 315 is provided at the other input terminal of the AND circuit 311. An output signal of the AND circuit 311 is provided to the NOT circuit 316. Also, the output signal of the AND circuit 311 is provided at one input terminal of the AND circuit 314.

Further, the output signal of the AND circuit 311 is provided, as the signal SG2', to the OR circuit (not shown) in the controller 140A. An output signal of the OR circuit is provided, as the control signal SG2, to the switching element SOL.

An output signal of the NOT circuit 316 is provided at one input terminal of the AND circuit 312. The select notification signal SLE, output from the lowest voltage detecting unit 141, is provided at the other input terminal of the AND circuit 312.

An output signal of the AND circuit 312 is provided at an input terminal of the NOT circuit 318. An output signal of the NOT circuit 318 is provided at an input terminal of the NOT circuit 319. An output signal of the NOT circuit 319, as a control signal SG12 for controlling on-off of the switching element S12, is provided to the switching element S12. Also, the output signal of the NOT circuit 319 is provided at an input terminal of the NOT circuit 317. Additionally, in the present embodiment, the NOT circuit 318 and the NOT circuit 319 form a delay circuit 400.

The output signal of the AND circuit 312 is also provided at one input terminal of the AND circuit 313. An output signal of the comparator 320 is provided at the other input terminal of the AND circuit 313.

An output signal of the AND circuit 313 is provided, as a control signal SG11 for controlling on-off of the switching element S11, to the switching element S11.

An inverting input terminal of the comparator 320 is connected with one end of the switching element S11 being connected with the secondary battery B1. A connecting point between the inverting input terminal of the comparator 320 and one end of the switching element S11 is shown as a connecting point P3.

A non-inverting input terminal of the comparator 320 is connected with the other end of the switching element S11 being connected with the coil L. A connecting point between the non-inverting terminal of the comparator 320 and the other end of the switching element S11 is shown as a connecting point P4.

In the present embodiment, the signal SG2', which is an output signal of the AND circuit 311, is provided at one input terminal of the AND circuit 314. An output signal of the NOT circuit 317 is provided at the other input terminal of the AND circuit 314. An output signal of the AND circuit 314 is provided, as the signal SG1', to the OR circuit (not shown) in the controller 140A. An output signal of the OR circuit is provided, as the control signal SG1, to the switching element SL.

In the present embodiment, the NAND circuit 321 and the NAND circuit 322 form a flip-flop. An output signal of the comparator 112 is provided at one input terminal of the NAND circuit 321 while an output signal of the NAND circuit 322 is provided at the other input terminal of the NAND circuit 321. The clock signal CLK output from the clock generating unit 142 is provided at one input terminal of the NAND circuit 322 while an output signal of the NAND circuit 321 is provided at the other input terminal of the NAND circuit 322. The output signal of the NAND circuit 321 is provided at an input terminal of the NOT circuit 315.

Figure 8:
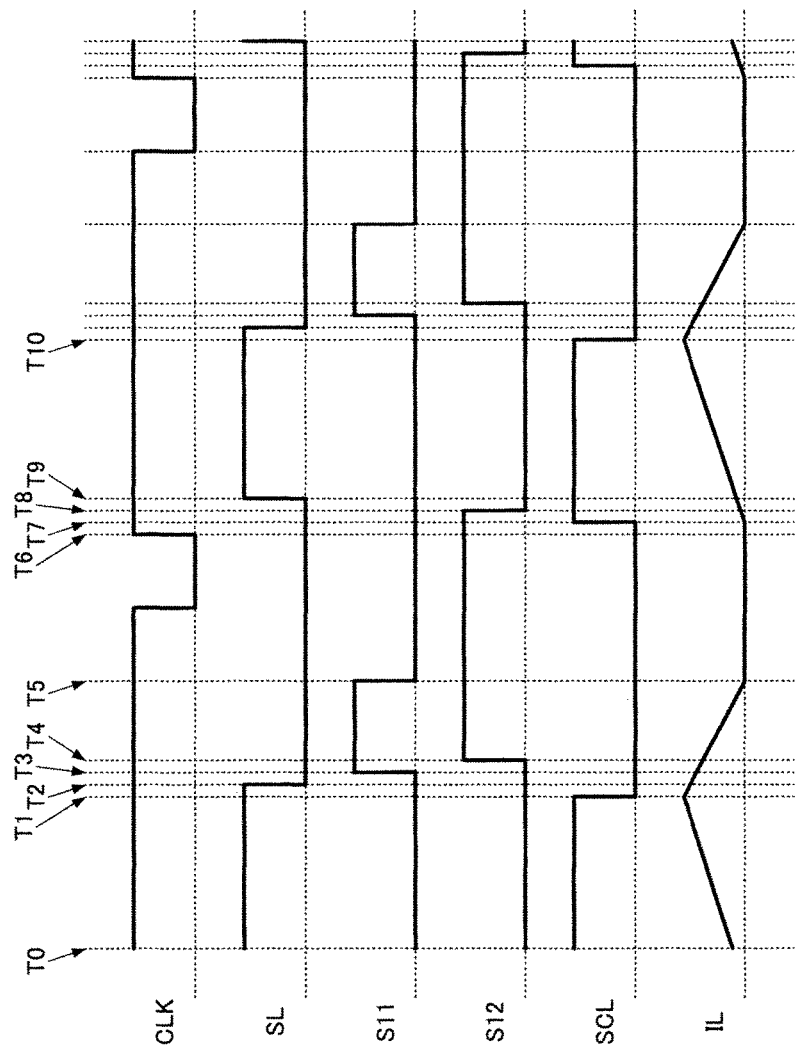
FIG. 8 is a timing diagram for illustrating an operation of a storage status adjusting circuit of the third embodiment.

Herein below, an operation of the storage status adjusting circuit 110A of the present embodiment will be described with reference to FIG. 8. FIG. 8 is a timing diagram for illustrating an operation of a storage status adjusting circuit of the third embodiment. In FIG. 8, an operation of the storage status adjusting circuit 110A, in a case where the secondary battery B1 has been detected by the lowest voltage detecting unit 141, and a H level select notification signal SLE has been provided to the logic circuit 410, is illustrated.

First, an operation of the storage status adjusting circuit 110A at timing T0 will be described. At timing T0, a H level clock signal CLK is provided. Signal level of an output signal of the comparator 112 is H level, since a voltage between connecting points P1 and P2 does not reach the reference voltage Vref, at timing T0. Therefore, the signal level of the output signal of the NAND circuit 321 becomes L level while the output signal of the NOT circuit 315 becomes H level. Here the signal level of the output signal of the AND circuit 311 is H level since the H level clock signal CLK is provided. That is, at timing T0, the signal levels of the signal SG2' and the control signal SG2 become H level, then the switching element SCL is switched on.

Also, at timing T0, since the signal level of the output signal of the NOT circuit 316 is L level, the signal level of the output signal of the AND circuit 312 becomes L level, then the signal level of the output signal of the NOT circuit 319 also becomes L level. Therefore, the signal level of the output signal of the NOT circuit 317 becomes H level, and the signal level of the output signal of the AND circuit 314 becomes H level. That is, at timing T0, the signal levels of the signal SG1' and the control signal SG1 become H level, then the switching element SL is switched on.

Thus, in the present embodiment, at timing T0, the coil L is connected in series with the secondary batteries B1-B4 when, for example, the storage battery pack 100A is not connected with a battery charger. In this case, the coil current IL is supplied from the assembled battery 120 to the coil L.

Further, at timing T0, since the signal level of the output signal of the NOT circuit 319 is L level, the signal level of the control signal SG12 becomes L level, and the switching element S12 is switched off. Also, at timing T0, the signal level of the output signal of the AND circuit 313 becomes L level since the signal level of the output signal of the AND circuit 312 is L level. Therefore, the signal level of the control signal SG11 is L level, then the switching element S11 is switched off.

In the following, an operation of the storage status adjusting circuit 110A at timing T1 will be described. At timing T1, a voltage between the connecting points P1 and P2 reaches the reference voltage Vref, and the output signal of the comparator 112 is inverted from H level to L level. Then, the signal level of the output signal of the NAND circuit 321 becomes H level and the signal level of the output signal of the NOT circuit 315 becomes L level. Thus, the signal level of the output signal of the AND circuit 311 becomes L level. That is, at timing T1, the signal levels of the signal SG2' and the control signal SG2 become L level, then the switching element SCL is switched off.

In the following, an operation of the storage status adjusting circuit 110A at timing T2 will be described. At timing T1, the output signal of the AND circuit 311 is inverted from H level to L level. The L level output signal of the AND circuit 311 is received by the AND circuit 314. Therefore, at timing T2, the output signal of the AND circuit 314 is inverted from H level to L level, and the signal levels of the signal SG1' and the control signal SG1 become L level, then the switching element SL is switched off.

In the present embodiment, time lag between timing T1 and timing T2 is caused by difference of number of gates through which a signal output from the comparator 112 passes to reach the switching element SCL and through which the signal output from the comparator 112 passes to reach the switching element SL. In FIG. 7, the number of the gates through which the signal output from the comparator 112 passes to reach the switching element SL is four, that is, the NAND circuit 321, the NOT circuit 315, and the AND circuits 311 and 314. Meanwhile, the number of gates through which the signal output from the comparator 112 passes to reach the switching element SCL is three, that is, the NAND circuit 321, the NOT circuit 315, and the AND circuits 311.

Therefore, in the present embodiment, a period between timing T1 at which the switching element SCL is switched off and timing T2 at which the switching element SL is switched off is equal to a time required for the output signal of the comparator to pass through the AND circuit 314.

In the present embodiment, at timing T2, both of the switching elements SL and SCL are switched off. Also, at timing T2, the switching elements S11 and S12 are switched off.

At this time, one end (being connected with the connecting point Lb) of the coil L is connected, though the diode D1, with the B+ terminal (the positive electrode of the secondary battery B1) while the other end (being connected with the connecting point La) of the coil L is connected, through the diode D2, with the B− terminal (the negative electrode of the secondary battery B4). Therefore, in the present embodiment, electric potentials at both ends of the coil L are fixed even if the switching elements SL and SCL are switched off and the switching elements S11 and S12 are switched off. Thus, according to the present embodiment, it is prevented that both ends of the coil L are disconnected from any elements, thereby enabling to stabilize the operation of the storage status adjusting circuit 110A.

In the following, an operation of the storage status adjusting circuit 110A at timing T3 will be described. The output signal of the NOT circuit 316 is inverted from L level to H level, at timing T1, when the output signal of the AND circuit 311 is inverted from H level to L level. Therefore, the output signal of the AND circuit 312 is inverted from L level to H level.

The H level output signal of the AND circuit 312 is provided at one input terminal of the AND circuit 313. At this time, an electric potential at the connecting point P4 is higher than an electric potential at the connecting point P3, since electricity is accumulated in the coil L. Therefore, the signal level of an output signal of the comparator 320 becomes H level.

Therefore, the output signal of the AND circuit 313 is inverted from L level to H level. That is, at timing T3, the signal level of the control signal SG11 becomes H level, then the switching element S11 is switched on.

Time lag between timing T2 and timing T3 is caused, for example, by difference of number of gates through which the output signal of the AND circuit 311 passes. The number of the gates through which the output signal of the AND circuit 311 passes to reach the switching element SL is one, that is, the AND circuit 314. Meanwhile, the number of the gates through which the output signal of the AND circuit 311 passes to reach the switching element S11 is three, that is, the NOT circuit 316, and the AND circuits 312 and 313.

A period between timing T2 and timing T3 corresponds to such difference of number of the gates.

In the following, an operation of the storage status adjusting circuit 110A at timing T4 will be described. When the output signal of the AND circuit 312 is inverted from L level to H level, the H level output signal is provided to the switching element S12 through the NOT circuits 318 and 319. Therefore, at timing T4, the signal level of the control signal SG12 becomes H level, then the switching element S12 is switched on.

As described above, at timing T4, the storage status adjusting circuit 110A of the present embodiment connects the secondary battery B1 detected by the lowest voltage detecting unit 141 with the coil L, thereby releasing electricity (energy) accumulated in the coil L to the secondary battery B1.

In the following, the delay circuit 400 formed by the NOT circuits 318 and 319 of the present embodiment will be described.

In the present embodiment, a gate through which the output signal of the AND circuit 312 passes to reach the switching element S11 is only the AND circuit 313. Therefore, in the present embodiment, the delay circuit 400 is disposed so that the output signal of the AND circuit 312 passes through at least two gates to reach the switching element S12.

In the present embodiment, the switching element S12 is switched on later than the switching element S11, by disposing more gates between the AND circuit 312 and the switching element S12 than between the AND circuit 312 and switching element S11.

In the present embodiment, through such operation, timings at which the switching elements S11 and S12 are switched on are controlled so that one end, being connected with the connecting point Lb, of the coil L is connected with the positive electrode of the secondary battery B1 prior to the other end thereof, when controlling to connect the coil L with the secondary battery B1.

Therefore, in the present embodiment, for example, it is prevented that the other end, being connected with the connecting point La, of the coil L is connected in advance with the negative electrode of the secondary battery B1 to cause release of electricity from the secondary battery B1 to the B− terminal, when controlling to connect the coil L with the secondary battery B1. In the storage status adjusting circuit 110A, in a case where the other end, being connected with the connecting point La, of the coil L is connected in advance with the negative electrode of the secondary battery B1, the negative electrode of the secondary battery B1 (the positive electrode of the secondary battery B2) is connected, through the switching element S12, the coil L1 and the diode D1, with the connecting point P5, thereby being connected with the B− terminal through the secondary batteries B1-B4. Therefore, the electricity accumulated in the coil L is also supplied to the secondary batteries B2-B4 as well as secondary battery B1. In other words, the electricity expected to be supplied to the secondary battery B1 is released to the secondary batteries B2-B4 until the switching element S11 is switched on. In the present embodiment, by connecting one end, being connected with the connecting point Lb, of the coil L with the positive electrode of the secondary battery B1 before connecting the other end of the coil L, the release of the electricity described above is prevented thereby reducing energy loss before charging the secondary battery B1.

Further, in the present embodiment, it is prevented that electric potential at the non-inverting input terminal of the comparator 320 (electric potential of the connecting point P4) becomes so high as to exceed the withstand voltage of the comparator 320, that could be caused by connecting the other end, being connected with the connecting point La, of the coil L in advance with the negative electrode of the secondary battery B1.

In the following, an operation of the storage status adjusting circuit 110A at timing T5 will be described. At timing T5, release of electricity from the coil L to the secondary battery B1 is finished. In the present embodiment, the timing at which release of electricity from the coil L is finished is detected based on a potential difference between the connecting point P3 and the connecting point P4. More specifically, in the present embodiment, an electrical potential at the connecting point P3 is compared with an electrical potential at the connecting point P4 by the comparator 320. Then, the storage status adjusting circuit 110A switches off the switching element S11 by an output signal of the comparator 320, when the electrical potential at the connecting point P3 becomes higher than the electrical potential at the connecting point P4, thereby disconnecting the coil L from the secondary battery B1. In the present embodiment, through such controlling of the switching element S11, energy back flow from the secondary battery B1 to the coil L is prevented.

At timing T5, the output signal of the comparator 320 is inverted from H level to L level when an electric potential at the connecting point P3 is higher than an electric potential at the connecting point P4, through energy release from the coil L to the secondary battery B1. Therefore, the output signal of the AND circuit 313 is inverted from H level to L level. That is, at timing T5, the signal level of the control signal SG11 becomes L level to switch off the switching element S11, thereby disconnecting the coil L from the secondary battery B1.

As described above, in a period from timing T4 to timing T5, the storage status adjusting circuit 110A of the present embodiment supplies electricity accumulated in the coil L to the secondary battery B1 to charge the secondary battery B1.

Additionally, in the present embodiment, at timing T5, the switching elements SL and SCL remain to be switched off while the switching element S12 remains to be switched on. In the present embodiment, the timing at which the control signals SG1 and SG2 are inverted to H level (the timing at which the switching elements SL and SCL are switched on) is determined based on the clock signal CLK.

At timing T5, the switching element S11 may be switched off prior to the switching element S12 since release of electricity from the coil L to the secondary battery B1 (i.e. charge of the secondary battery B1) has been finished.

Then, at timing T6, the clock signal CLK becomes H level. The signal levels of the signal SG2' and the control signal SG2 become H level at timing T7, and the switching element SCL is switched on. At timing TB, the signal level of the control signal SG12 becomes L level, then the switching element S12 is switched off. At timing T9, the signal levels of the signal SG1' and the control signal SG1 become H level, thereby switching on the switching element SL.

A period between timing T7 and timing T8 corresponds to difference of the number of gates between those disposed between the output terminal of the AND circuit 311 and the switching element S12, and those disposed between the output terminal of the AND circuit 311 and the switching element SL.

In the present embodiment, at timing T9, an operation of the storage status adjusting circuit 110A of the present embodiment is similar to that at timing T0, and the coil current IL starts to be supplied to the coil L.

The lowest voltage detecting unit 141 of the present embodiment may detect a secondary battery having the lowest cell voltage during a term between timing T5 and timing T6 at which the clock signal CLK next rises. Also, the lowest voltage detecting unit 141 may detect a secondary battery having the lowest cell voltage during a term between timing T5 and timing T10 at which supply of the coil current IL to the coil L is stopped. The lowest voltage detecting unit 141 of the present embodiment, for example, may detect a secondary battery having the lowest cell voltage in every certain interval.

Further, in FIG. 8, the operation of the switching elements SL and SCL and the switching elements S11 and S12 that are controlled by the logic circuit 410 is illustrated, while illustration of the operation of the switching elements that are controlled by the logic circuits 420, 430 and 440 is omitted.

In an example of FIG. 8, the logic circuits 420, 430 and 440 respectively control the switching elements S21 and S22, the switching elements S31 and S32, and the switching elements S41 and S42 to be switched off.

Then, for example, if the lowest voltage detecting unit 141 detects the secondary battery B2 after timing T5 shown in FIG. 8, the logic circuit 420 performs a similar operation to an operation of the logic circuit 410 as described above. That is, the logic circuit 420 controls on-off of the switching elements SL and SCL and the switching elements S21 and S22 to release electricity accumulated in the coil L to the secondary battery B2. Meanwhile, the logic circuits 410, 430 and 440 respectively control the switching elements S11 and S12, the switching elements S31 and S32, and the switching elements S41 and S42 to be switched off.

Herein below, an operation of the logic circuit 410 will be described, in a case where a secondary battery other than the secondary battery B1 is detected by the lowest voltage detecting unit 141.

The lowest voltage detecting unit 141 of the present embodiment provides H level select notification signal SLE to a logic circuit which corresponds to the detected secondary battery, while providing L level select notification signal SLE to logic circuits other than the logic circuit which corresponds to the detected secondary battery.

Further, the clock generating unit 142 of the present embodiment provides the clock signal CLK being fixed at a signal level thereof to L level to the logic circuits other than the logic circuit which corresponds to the secondary battery detected by the lowest voltage detecting unit 141.

Therefore, in a case where the lowest voltage detecting unit 141 does not detect the secondary battery B1, the clock signal CLK, which is provided at one input terminal of the AND circuit 311, is fixed to L level, and an output signal of the AND circuit 311 is also fixed to L level. Thus, the signal SG1' and the signal SG2' are also fixed to L level.

Further, the select notification signal SLE, which is provided at one input terminal of the AND circuit 312, is fixed to L level, and an output signal of the AND circuit 312 is also fixed to L level. Thus, an output signal of the AND circuit 313 is fixed to L level, and thereby the control signals SG11 and SG12 become L level; then the switching elements S11 and S12 are switched off.

As described above, in the storage status adjusting circuit 110A of the present embodiment, the switching elements SL and SCL are switched on by detecting a rising edge of the clock signal CLK, and the coil L is connected between the B+ terminal and the B− terminal to accumulate electricity in the coil L. Also, in the storage status adjusting circuit 110A of the present embodiment, the switching elements S11, S12, S21, S22, S31, S32, S41 and S42 are operated so as to connect the coil L with a secondary battery having the lowest cell voltage when electricity accumulated in the coil L reaches a certain value.

That is, in the present embodiment, a closed loop is formed by connecting the coil L with a secondary battery having the lowest cell voltage, which is detected in every certain interval, then, in this closed loop, electricity accumulated in the coil L is supplied to the secondary battery to charge the secondary battery.

The storage status adjusting circuit 110A of the present embodiment can adjust the storage status through the operation described above to charge only the secondary battery having the lowest cell voltage among the secondary batteries. Further, the storage adjusting circuit 110A of a present embodiment can adjust the storage status of the secondary batteries using one coil. Thus, the present embodiment can greatly contribute to downsizing compared to a transformer-type, and this advantageous effect becomes more remarkable, especially, in a case where a larger current has to be controlled. Also, it is known that energy loss is caused by a transformer not only with load but also without load; the present embodiment can eliminate energy-loss caused by transformers.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2014-039210 filed on Feb. 28, 2014, Japanese Priority Application No. 2014-249245 filed on Dec. 9, 2014, and Japanese Priority Application No. 2015-024870 filed on Feb. 12, 2015, the entire contents of which are hereby incorporated herein by reference.

DESCRIPTION OF THE REFERENCE NUMERALS 100, 100A storage battery pack
110, 110A storage status adjusting circuit
120 assembled battery
130 cell voltage detecting circuit
140 controller
141 lowest voltage detecting unit
142 clock generating unit
210, 220, 230, 240, 210A, 410, 420, 430, 440 logic circuit

The invention claimed is:

1. A storage status adjusting device, comprising:
a coil;
a controller that determines whether a value of current that flows in the coil is greater than or equal to a certain value;
a first switching unit configured to switch between energy accumulation and energy release in the coil; and
second switching units configured to connect or disconnect a plurality of corresponding storage batteries with the coil,
each of the second switching units including
a first switching element to connect a positive electrode of the corresponding storage battery with one end of the coil, and
a second switching element to connect a negative electrode of the corresponding storage battery with the other end of the coil,
wherein the second switching units are switched off when the first switching unit is switched on,
wherein upon the controller determining that a value of current that flows in the coil is greater than or equal to a certain value, the first switching unit is switched off and only one of the second switching units is switched on, to connect at least one battery amongst the plurality of storage batteries with the coil, and
wherein after switching off the first switching unit, the first switching element is switched on to connect a positive electrode of the corresponding storage battery amongst the storage batteries with one end of the coil, and subsequently the second switching element is switched on to connect a negative electrode of the corresponding storage battery with the other end of the coil, each of the first switching element and the second switching element remaining switched on until the first switching element is subsequently switched off, while the second switching element, connecting the negative electrode of the corresponding storage battery with the other end of the coil, remains switched on.

2. The storage status adjusting device as claimed in claim 1, wherein the one of the second switching units corresponds to a storage battery having the lowest voltage among the storage batteries.

3. The storage status adjusting device as claimed in claim 1,
wherein
the first switching unit includes a third switching element configured to connect one end of the coil with a positive electrode of the storage batteries which are connected in series; and
a fourth switching element configured to connect a negative electrode of the storage batteries with the other end of the coil, wherein
a first diode is disposed between the first switching element and the third switching element, and a second diode is disposed between the second switching element and the fourth switching element.

4. A storage battery pack, comprising:
the storage status adjusting device as claimed in claim 1; and
the plurality of storage batteries.

5. The storage status adjusting device as claimed in claim 1, wherein the controller includes one or more logic circuits to control supply of electricity from the coil,
a logic circuit amongst the one or more logic circuits includes a comparator having an inverting input and a non-inverting input,
a connecting point between the positive electrode of the corresponding storage battery and one end of the first switching element is connected to the inverting input of the comparator, and a connecting point between the one end of the coil and the other end of the first switching element is connected to the non-inverting input of the comparator, and the logic circuit switches off the first switching element based on an output signal of the comparator which is generated when an electrical potential at the connecting point between the positive electrode of the corresponding storage battery and the one end of the first switching element becomes higher than the connecting point between the one end of the coil and the other end of the first switching element.

* * * * *